US012762958B2

(12) United States Patent
de la Cruz et al.

(10) Patent No.: US 12,762,958 B2
(45) Date of Patent: Oct. 13, 2026

(54) FLEET MANAGEMENT OF UNMANNED AERIAL VEHICLES AND FLIGHT AUTHORIZATION SYSTEM

(71) Applicant: Skydio, Inc., San Mateo, CA (US)

(72) Inventors: Jason de la Cruz, San Franciso, CA (US); Brad Mandala, San Francisco, CA (US); Charles Taylor, San Francisco, CA (US); Edward Dale Steakley, Cupertino, CA (US)

(73) Assignee: Skydio, Inc., San Mateo, CA (US)

( * ) Notice: Subject to any disclaimer, the term of this patent is extended or adjusted under 35 U.S.C. 154(b) by 118 days.

(21) Appl. No.: 18/584,438

(22) Filed: Feb. 22, 2024

(65) Prior Publication Data

US 2024/0346937 A1 Oct. 17, 2024

Related U.S. Application Data

(63) Continuation of application No. 17/375,970, filed on Jul. 14, 2021, now Pat. No. 11,915,598, which is a continuation of application No. 15/720,939, filed on Sep. 29, 2017, now Pat. No. 11,094,205.

(60) Provisional application No. 62/402,942, filed on Sep. 30, 2016.

(51) Int. Cl.

| | |
|---|---|
| ***G08G 5/32*** | (2025.01) |
| ***B64C 39/02*** | (2023.01) |
| ***B64U 10/14*** | (2023.01) |
| ***G05D 1/617*** | (2024.01) |
| ***G08G 5/57*** | (2025.01) |

(52) U.S. Cl.
CPC ............ *G08G 5/32* (2025.01); *B64C 39/024* (2013.01); *B64U 10/14* (2023.01); *G05D 1/617* (2024.01); *G08G 5/57* (2025.01)

(58) Field of Classification Search
CPC ........... G08G 5/21; G08G 5/26; G08G 5/265; G08G 5/30–38; B64C 39/024; G05D 1/0027; G05D 1/0055; G05D 1/6987; G01C 21/20
See application file for complete search history.

(56) References Cited

U.S. PATENT DOCUMENTS

| | | | | |
|---|---|---|---|---|
| 9,734,723 | B1 * | 8/2017 | Bruno | G01C 21/3826 |
| 11,094,205 | B2 | 8/2021 | De La Cruz et al. | |
| 2009/0142569 | A1 * | 6/2009 | Gaydoul | C08L 81/02 428/220 |
| 2016/0039300 | A1 | 2/2016 | Wang et al. | |
| 2018/0002010 | A1 * | 1/2018 | Bauer | G05D 1/689 |

(Continued)

*Primary Examiner* — Spencer D Patton

(57) ABSTRACT

Methods, systems and apparatus, including computer programs encoded on computer storage media for fleet management of unmanned aerial vehicles, including flight authorization. One of the methods includes maintaining one or more rules associated with authorizing UAVs to implement flight plans. A request to generate a flight plan associated with a job is received, the request including information indicating a flight pattern comprising, at least, one or more waypoints associated with geospatial references. The flight plan is generated based on the request, and an initial authorization check is determined based on the maintained rules and the generated flight plan. Upon a positive determination, access to the generated flight plan is provided by a ground control system, and the flight plan is implemented.

25 Claims, 8 Drawing Sheets

(56) References Cited

U.S. PATENT DOCUMENTS

| | | | | |
|---|---|---|---|---|
| 2018/0061249 | A1* | 3/2018 | Cui | G08G 5/76 |
| 2018/0108260 | A1 | 4/2018 | Kuhara | |
| 2018/0253092 | A1 | 9/2018 | Trapero Esteban et al. | |
| 2019/0087576 | A1 | 3/2019 | Olson | |
| 2019/0278897 | A1* | 9/2019 | Zhang | G08G 5/55 |

* cited by examiner

FLEET MANAGEMENT OF UNMANNED AERIAL VEHICLES AND FLIGHT AUTHORIZATION SYSTEM

CROSS-REFERENCE TO RELATED APPLICATION(S)

This application is a continuation of U.S. patent application Ser. No. 17/375,970, filed Jul. 14, 2021; which is a continuation of U.S. patent application Ser. No. 15/720,939, filed Sep. 29, 2017; which claims the benefit of priority to U.S. Provisional Patent Application No. 62/402,942, filed Sep. 30, 2016, the entire disclosure of each of which is hereby incorporated by reference.

BACKGROUND

Aircraft require routine maintenance to safely and correctly function, and are therefore routinely serviced on an as-needed or a routine basis according to a schedule. In this way, safety problems associated with aircraft flying can be detected, and the aircraft can be grounded while the detected problems are corrected.

SUMMARY

Particular embodiments of the subject matter described in this specification can be implemented so as to realize one or more of the following advantages. A company that maintains a fleet of unmanned aerial vehicles (UAVs) should ensure that every operation of a UAV is (1) safe, (2) functional, and (3) in compliance with UAV operating rules (e.g., in the United States, compliance with operating rules under 14 CFR Section 107 is paramount). For instance, an operator may want to utilize a UAV to perform an inspection of a structure (e.g., a bridge, building, wind turbine) or area (e.g., a mine, farm, construction site), and not realize that the UAV includes a component that has been identified as defective (e.g., as noted in a recall by a manufacturer), or that the UAV is in need of servicing. As will be described, a fleet of unmanned aerial vehicles (UAVs) can be monitored by a system, and for any flight plan to perform a job (e.g., an inspection of a structure or area for damage, and so on), the system can authorize only particular UAVs in the fleet to implement the flight plan. Additionally, any UAV, including a UAV presently in flight, can be grounded by the system, and be prevented from performing an otherwise scheduled flight plan.

Furthermore, each UAV can be constrained to implement a flight plan only upon receiving authorization with the flight plan. That is, a UAV can be set in a 'do-not-fly' status, and be made operational (e.g., set in an operational status) upon receiving such authorization. The authorization may be based not merely on a flight plan, but on specifics of the UAV, therefore increasing likelihood of a safe and successful flight plan.

In general, one innovative aspect of the subject matter described in this specification can be embodied in systems, computer readable media, and methods that include the actions of maintaining one or more rules associated with authorizing UAVs to implement flight plans; receiving a request to generate a flight plan associated with a job, the request including information indicating a flight pattern comprising, at least, one or more waypoints associated with geospatial references; generating the flight plan based on the request, and determining an initial authorization check based on the maintained rules and the generated flight plan; and upon a positive determination, providing access to the generated flight plan by a ground control system comprising one or more computer processors, the ground control system being configured to provide the flight plan to a particular UAV for implementation, and the ground control system being configured to determine a subsequent authorization check based, at least in part, on the maintained rules, wherein upon a positive determination, the ground control system is configured to provide authorization information to the particular UAV along with the flight plan enabling the particular UAV to navigate according to the flight plan, and wherein upon a negative determination, the ground control system inhibits the particular UAV from implementing the flight plan.

The details of one or more embodiments of the subject matter of this specification are set forth in the accompanying drawings and the description below. Other features, aspects, and advantages of the subject matter will become apparent from the description, the drawings, and from the claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
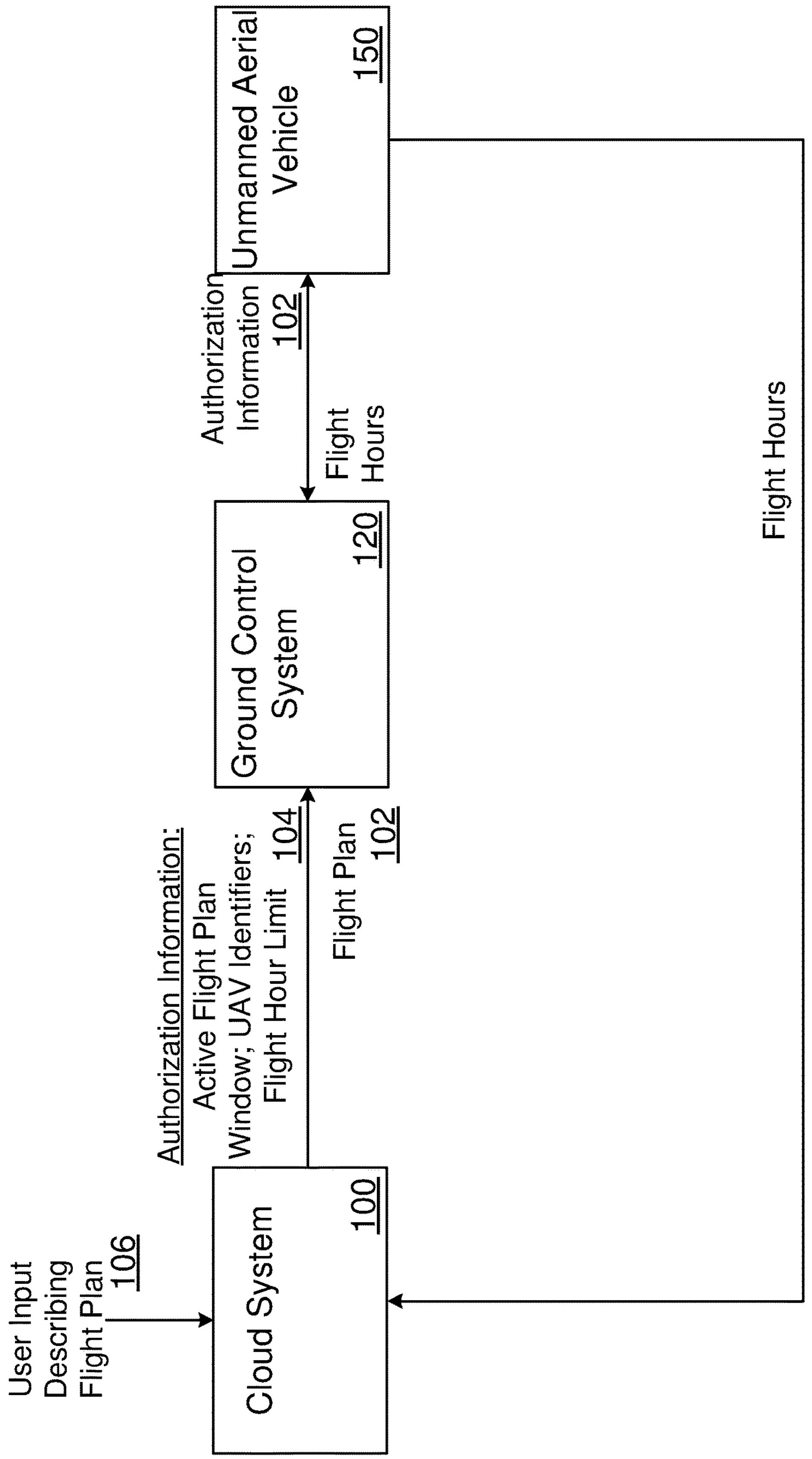
FIG. 1 illustrates a block diagram of authorizing a UAV to implement a flight plan.

This specification describes authorizing an unmanned aerial vehicle (UAV) to implement a particular flight plan. As will be described, one or more authorization checks can be performed prior to a UAV being able to implement a flight plan, which in this specification includes information sufficient to enable the UAV to navigate according to the flight plan, travel to one or more waypoints and perform one or more actions, be constrained to locations within a geofence envelope (e.g., described below), and so on. The UAV can be placed into an operational mode or state, only upon each of the authorization checks being satisfied. For instance, the authorization checks can ensure that a UAV implementing a flight plan (1) is implementing an active flight plan, for instance implementing the flight plan within a particular amount of time of generation of the flight plan (e.g., the flight plan can have an expiration, such as one week, 30 days, 90 days, from the flight plan being generated), (2) will not exceed a number of flights hours between maintenance checks, (3) does not include particular components (e.g., hardware and/or software, such as components associated with being faulty or with a recall), (4) will not be operating within an area associated with a temporary flight restriction, and so on. Additionally, the authorization checks can utilize environmental information to ensure that the UAV will not violate regulatory rules (e.g., rules from the Federal Aviation Authority FAA, such as a rules associated with times at which UAVs can be flown, minimum weather visibilities, and so on), or that the UAV will not be negatively affected by weather.

As will be described, the authorization checks can be performed by one or more systems or devices. For instance, a first authorization check can be performed by a system associated with generating flight plans (e.g., the cloud system 100 described below). The system, for example during generation of a flight plan or subsequent to generation, can determine one or more UAVs that are authorized to implement the flight plan. As an example, the system can monitor information associated with UAVs in a fleet of UAVs, including flight hours, components, and so on, and based on the flight plan can identify authorized UAVs. For instance, a UAV that will be in need of a maintenance check after flying an additional 5 hours, may not be authorized by the system to implement a flight plan that is indicated as lasting longer than 5 hours, or lasting within a threshold amount of time of 5 hours, while a flight plan indicated as lasting one hour may be acceptable. In another instance, a UAV that includes, or optionally that will make use of, a particular component (e.g., a component associated with a fault or recall) will not be authorized. The system can generate authorization information, for instance information specifying identifiers of UAVs authorized to implement the flight plan (e.g., tail numbers or other identifiers such as a UID), information specifying the particular amount of time during which the flight plan can be implemented, and so on. The generated authorization information can be associated with the flight plan, such that a particular UAV utilized to implement the flight plan, can be placed in an operational mode using (e.g., processing) the authorization information.

Subsequent to generation of the flight plan, a second authorization check can be performed by a user device of an operator associated with implementation of the flight plan (e.g., hereinafter referred to as a ground control system). The ground control system can perform the second authorization check when the operator is at a location associated with the flight plan, and can verify the information determined by the system. For instance, the ground control system can receive the flight plan, and the operator can obtain a particular authorized UAV to implement the flight plan and then travel to the location associated with the flight plan. The second authorization check can determine, for instance, one or more of, (1) the flight plan being active (e.g., the flight plan is not older than the particular amount of time), (2) the particular UAV being authorized to implement the flight plan (e.g., the particular UAV was specified by the system), and (3) optionally the particular UAV not exceeding a number of flight hours between maintenance checks (e.g., the system may not have access to the most recent information associated with the particular UAV, and the ground control system can communicate with the particular UAV to obtain a current number of flight hours), (4) the particular UAV is not outside of a required maintenance window (e.g., in addition to monitoring flight hours, each UAV may require maintenance after a threshold number of days, months, and soon, such as 6 months, 12 months), or (4) the particular UAV not including an unauthorized component (e.g., since a time at which the flight plan was generated and authorized by the system, a recall notice may have come into effect for the component), and/or (5) environmental information, such as a present weather or present time, not causing violations of rules (e.g., regulatory rules, company rules).

Upon a successful second authorization check by the ground control system, the ground control system can provide the flight plan and authorization information to the particular UAV. As described above, the particular UAV can only be placed in an operational state (e.g., be able to receive and/or implement a flight plan) upon receipt and verification of the authorization information. For instance, the particular UAV can ensure one or more of, (1) the authorization information was validly generated by the system or ground control system (e.g., the authorization information can be signed), (2) the particular UAV is indicated as being authorized in the authorization information, (3) the flight plan is active (e.g., the flight plan is not older than a particular amount of time), and so on.

In this way, UAVs can be easily grounded based on one or more authorization checks performed by (1) a system, (2) a ground control device, and/or (3) a UAV itself. In this way, complexities associated with maintaining a fleet of UAVs each potentially including different components (e.g., the UAVs may be off the shelf), requiring different maintenance schedules and being in different stages between the schedules, can be reduced or eliminated. Additionally, use of the systems and methods described herein solve technological problems associated with flight plan generation. For instance, a time associated with generation of a flight plan can be reduced, as complex checks to ensure that implementation of the flight plan by a UAV is safe can be performed in a more succinct manner.

Furthermore, as will be described the authorization checks can respond to any temporary flight restrictions (TFRs) that may suddenly appear. For instance, the system can check for a TFR at a location associated with a flight plan, and can present information to the user describing the TFR while also including the TFR information in the authorization information. In this way, should an operator elect to implement the flight plan with a UAV, the ground control system and/or UAV will access the generated authorization information, determine that the flight plan is not authorized due to the TFR, and the operator will be unable to implement the flight plan. Additionally, the ground control system can obtain up to date TFR information a threshold amount of time prior to implementation of the job (e.g., while the operator is located near a location of the flight plan, or while the operator is traveling the location, and based on information describing cell phone service, can check for any active TFRs at the location a threshold distance before the cell phone service is expected to be diminished below a threshold), and/or during implementation of the job (e.g., described below, with respect to FIGS. 6-7).

Optionally, the cloud system can actively monitor for TFRs, and upon determining that an active TFR has popped up at a location associated with a flight plan, can provide information to the ground control system of an operator specifying the TFR. This information may (1) update the authorization information, such that the flight plan will not be authorized for implementation, (2) instruct the ground control system to send a request to a UAV already implementing the flight plan to immediately land, or (3) instruct the ground control system to update the flight plan such that the UAV will not navigate within a threshold distance of the TFR (e.g., the TFR may include a portion of a large area being inspected, and the ground control system may indicate that the UAV cannot inspect the included portion). As an added measure, optionally the ground control system may not have access to a data connection (e.g., LTE, 4G, 3G, service), but may be able to receive a text message or phone call. In this case, the system may provide a text message to the ground control system, or call the ground control system, and the ground control system may parse the text message or interpret the phone call to determine that a TFR is active. Furthermore, a cell phone of an operator may receive the text message or phone call, and utilizing a wireless connection with the ground control system (e.g., a Bluetooth or Wi-Fi connection), can provide information identifying the TFR to the ground control system.

In this specification, UAVs, such as drones, un-operated aerial vehicles, remotely operated aircraft, unmanned aircraft systems, any aircraft covered under Circular 328 AN/190 classified by the International Civil Aviation Organization, and so on. In addition, certain aspects of the disclosure can be utilized with other types of unmanned vehicles (e.g., wheeled, tracked, and/or water vehicles). Sensors, which are included in the general term payload modules (e.g., any hardware, software, module, and so on, that is not critical to the flight operation of the UAV), can include any device that captures real-world information, including cameras, radiation measuring instruments, distance detectors such as Lidar, and so on.

FIG. 1 illustrates a block diagram of an example of authorizing a UAV 150 to implement a flight plan 102. As described above, a system (e.g., the cloud system 100) can generate a flight plan 102 along with authorization information 104 specific to one or more UAVs (e.g., the UAV 150). A user device of an operator (e.g., the ground control system 120) can receive the flight plan 102, verify that the UAV 150 is authorized to implement the flight plan 102, and the UAV 150 can be enabled to navigate according to the flight plan 102. Other methods of authorizing the UAV 150 will be described below, and it should be understood that the example of FIG. 1 is non-limiting. For instance, and as will be described below with respect to FIG. 4, the ground control system 120 can authorize the UAV 150 to implement the flight plan 102 without receiving authorization information 104 from the cloud system 100. Additionally, and as will be described below with respect to FIG. 5, the UAV 150 can similarly receive information from the ground control system 120, and utilizing the information can itself authorize the received flight plan 102.

As illustrated, a user of the cloud system 100 can provide user input 106 describing a flight plan, and the cloud system 100 can generate a flight plan 102 associated with the performance of a job. For instance, a first example flight plan may be associated with inspections of a rooftop. A second example flight plan may be associated with navigating along conductors connecting two transmission towers, and then maneuvering around a particular transmission tower obtaining images from various angles and distances from the particular transmission tower. In general, the user input 106 specifies (1) waypoints to which a UAV is to travel, and optionally at each waypoint, actions to be performed (e.g., descend to an altitude at the waypoint and periodically obtain images during descent; measure real world information using one or more sensors at the waypoint, execute complex flight maneuvers based on the waypoint, and so on), (2) a geofence envelope, indicating an area or volume of space to which the UAV is to be constrained, (3) a take-off and one or more landing locations, with at least one landing location being within the geofence envelope (e.g., additional landing locations may be associated with handling contingency situations, in which the UAV will be forced to land).

For ease of describing a flight plan, the cloud system 100 can generate user interfaces for presentation on a user device of the user, such as a laptop, tablet, and so on, which can receive succinct user input describing the flight plan. For instance, a user can indicate a location at which a flight plan is to occur, and the cloud system can access map or satellite information associated with the location, and present the map or satellite information in a user interface. The user can then describe a geofence envelope, for instance by selecting one or more corners of a polygon encompassing the geofence envelope, or through interactions with a touch screen display (e.g., selecting one or more locations and stretching a polygon into existence through movement of the user's fingers). Within this described geofence envelope, the user can further specify waypoints, select actions at each waypoint (e.g., a user interface can provide an easy selection of potential actions), and so on.

Based on the user input 106, the cloud system 100 can generate the flight plan 102, including a particular flight pattern through the waypoints, and optionally speeds to travel at between waypoints, altitudes to navigate at, and so on. Since the flight plan 102 merely describes actions a UAV will take (e.g., flying, obtaining images, measuring sensor information), the user can also utilize the cloud system 100 to ensure that the flight plan 102 will be performed safely and in accordance with operational rules, such as rules from a regulatory agency (e.g., the FAA), a company (e.g., a company that maintains a fleet of UAVs), and so on. Further examples and description of generating a flight plan are described in U.S. patent application Ser. No. 15/042,798, titled "UNMANNED AERIAL VEHICLE REMOTE FLIGHT PLANNING SYSTEM," which is hereby incorporated by reference in its entirety for all purposes.

As described above, the cloud system 100 can determine authorization information 104 which is usable by one or more of (1) the ground control system 120, (2) the UAV 150, to enable the UAV 150 to become operational and implement the flight plan 102. In the example of FIG. 1, the determined authorization information 104 is provided to the ground control system 120, and subsequently to the UAV 150.

As will be described below, with respect to FIG. 2, the cloud system 100 can maintain, or be able to access, one or more databases that store information associated with multitudes of UAVs within a fleet of UAVs. The information can include a number of flight hours of each UAV (e.g., obtained from each UAV, such as from a Hobbs meter), maintenance information (e.g., a time since each UAV was serviced or otherwise a maintenance procedure was performed; log data specifying results of maintenance, including textual descriptions, parsed descriptions or values associated with maintenance; and so on), configuration information associated with components of each UAV (e.g., particular hardware included in, or otherwise utilized by, each UAV; software included in each UAV, such as particular versions or revisions of software; and so on).

The cloud system 100 can utilize the maintained information to identify one or more UAVs that are authorized to implement the flight plan 102, for instance without exceeding a number of flight hours before maintenance is required, and that do not include components not authorized for use (e.g., faulty components, components associated with recalls). For instance, the cloud system 100 can analyze the flight plan 102, and determine a time estimate associated with implementation of the flight plan. The cloud system 100 can then identify UAVs that, after including the time estimate, will not exceed, or will not be within a threshold of, the number of flight hours flown before needing maintenance. As an example of determining a time estimate, the cloud system 100 can utilize the flight pattern information, such as a number of waypoints, a distance between each waypoint, actions that are to be taken at each waypoint, and so on, and optionally utilizing a specified or average speed (e.g., based on the configuration information of the UAV, or based on average speeds of UAVs during flight), can determine a time estimate for completion of the flight plan. Determining time estimates will be described below in more detail, with respect to FIG. 3.

Additionally, a user of the cloud system 100 can provide input 106 describing multiple flight plans, and the cloud system 100 can identify one or more UAVs that are each authorized to implement all of the multiple flight plans. For instance, the user can batch together multiple flight plans, such that an operator can utilize a single UAV and inspect multitudes of houses for an entire day, or for multiple days. The cloud system 100 can identify UAVs that are authorized to fly for the entirety of the day or the multiple days, such that the operator can simply grab an authorized UAV, inspect the houses for the day, grab the authorized UAV again on the next day and inspect the houses, and so on, without being concerned about violating maintenance or other authorization rules.

Optionally, when providing user input 106 describing the flight plan 102, the user can identify a particular UAV that will be utilized. That is, the user may prefer that the particular be utilized as it may have specific sensors or cameras advantageous for the flight plan 102. Additionally, the particular UAV may be the only UAV available (e.g., other UAVs may be in use on a day associated with the flight plan), or the particular UAV may otherwise be preferable. The cloud system 100 can access maintained information associated with the UAV, and while the user is describing the flight plan 102, the cloud system 100 can determine whether the particular UAV would be authorized to implement the fight plan 102.

For instance, the flight plan can indicate an estimated time of 5 hours, and the particular UAV may require a maintenance check at an additional 5 hours of flight time. The cloud system 100 can provide information to the user indicating that the flight plan will not be authorized absent a maintenance check being performed on the particular UAV. Optionally, the user can override the cloud system 100, and the particular UAV can be used to implement the flight plan, but automatically land (e.g., ground itself) once it flies for the additional 5 hours. Thus, the flight plan may not be able to be completed. Optionally, the cloud system 100 can analyze the flight plan, and determine recommendations to break up the flight plan, such that a portion of the flight plan can be completed by the particular UAV (e.g., the cloud system 100 can recommend a flight plan that is 3-4 hours long). For example, the cloud system 100 can access property information associated with an area being inspected, and can recommend that the flight plan be broken up according to property boundaries (e.g., if the flight plan was associated with inspecting two adjacent structures, the cloud system 100 can recommend that a single structure be inspected. Similarly, for a flight plan associated with multiple inspections (e.g., inspecting multiple transmission towers, wind turbines, and so on), the cloud system 100 can recommend that a threshold number of the inspections be implemented, while remaining inspections be implemented using a different UAV.

As described above, the cloud system 100 determines UAVs that will not exceed a number of hours flown before requiring a maintenance check, and also that (1) do not include components not authorized and/or (2) only include components which are authorized. That is, the cloud system can access a black list of components (e.g., a list identifying components, such as particular hardware including particular lot numbers, hardware revisions, and so on, that are not authorized for use) and/or a white list of components (e.g., a list identifying components that are authorized for use). For instance, a problem can be identified with a particular component, such as a global navigation satellite system (GNSS) receiver, and the cloud system 100 can obtain information identifying the problem (e.g., the cloud system 100 can monitor exploit services and news, such as monitoring common vulnerability and exposures 'CVE' information, monitoring information from manufacturers such as recall notices, and/or the cloud system 100 can be manually updated by one or more users). When determining UAVs authorized to implement the flight plan 102, the cloud system 100 ensures that a UAV including the faulty GNSS receiver will not be authorized. Optionally, the authorization can be limited to components that are indicated as being flight-critical, for instance components which would affect a safe or successful implementation of the flight plan 102.

For components indicated as not authorized that are also not flight-critical, such as payload modules which as described above can include sensors (e.g., cameras, ultraviolet sensors, infrared sensors, radiation sensors, distance sensors, and so on) or other components, the cloud system 100 can optionally determine whether the components can affect a safe or successful implementation of the flight plan. For example, the cloud system 100 can analyze the flight plan 102, and determine whether the component will be utilized (e.g., a faulty radiation sensor may not impact the implementation of a flight plan to inspect a transmission tower, the cloud system 100 can analyze the waypoint information, including actions associated with the waypoints, and determine that the radiation sensor will not be utilized), and if not then authorize a UAV that includes the component to implement the flight plan 102. Optionally, if the component will be utilized, the cloud system 100 can determine modifications to the flight plan 102 such that any negative impact on implementation of the flight plan 102 will be eliminated or reduced below a threshold. For example, a faulty camera (e.g., a camera that is unable to zoom past a threshold focal length, is unable to capture images past a particular shutter speed, and so on), may be authorized if the flight plan is modified (e.g., the flight plan can cause the UAV to move closer to a subject or object being imaged, or the flight plan can cause the UAV to travel at a reduced speed such that images can be captured at the particular shutter speed and not be blurry). In all situations in which a component that is identified in a black list or not included in a white list and is authorized for use, the user of the cloud system 100 can be required to confirm that the component can be included in a UAV implementing the flight plan 102. Similarly, the user can approve any modified flight plan before the modified flight plan is authorized for implementation. Furthermore, the cloud system 100 can first identify UAVs that do not include components that are not authorized, and only upon not identifying any UAVs, can determine modified flight plans, and so on as described above.

As described above, the cloud system 100 can authorize UAVs that either do not include components identified as not authorized (e.g., a black list, such as faulty, exploitable, and so on, components), or can authorize UAVs that only include components identified as authorized (e.g., a white list). The user of the cloud system 100 can elect that the cloud system 100 authorize UAVs based on the black list and/or the white list. Optionally, the cloud system 100 can automatically prefer the white list based on the flight plan. As an example, for a flight plan that is located over a populated area (e.g., a density greater than a threshold) or over a sensitive area (e.g., an area in which a fire can easily start and spread, such as a national forest, for instance during summer months), the cloud system can select that the white list be utilized. In this way, the user of the cloud system 100 can have a greater assurance that the flight plan will be safely implemented, since the components are specifically identified as being allowed for use.

Upon identifying UAVs that are authorized as described above, the cloud system 100 can generate authorization information 104 that includes one or more of (1) identifiers associated with the identified UAVs (e.g., tail numbers), a maximum flight time before maintenance is required, and an active time window during which the flight plan 102 is authorized to be implemented (e.g., 7 days, 30 days, 90 days, user selectable time period). In this way, the authorization information 104 can be associated with the flight plan 102 (e.g., packaged together), such that the flight plan 102 is only implementable by a UAV if the authorization information 104 is satisfied.

After generation of the flight plan 102 and authorization information 104, an operator can optionally be assigned to the flight plan 102. The operator can obtain one of the authorized UAVs (e.g., UAV 150), and travel to a location to implement the flight plan 102. As described above, the operator can utilize a ground control system 120 (e.g., a device of one or more processors, such as a laptop, tablet, mobile device, wearable device) in combination with the UAV 150. The ground control system 120 can obtain the flight plan 102 (e.g., over a wired or wireless connection, for instance the operator can obtain the flight plan 102 from the cloud system 100 before traveling to implement the flight plan 102, or the operator can obtain the flight plan 102, or check for any updates to the flight plan 102, from the cloud system 100 while traveling or while at the location associated with the flight plan 102), and present information describing the flight plan to the operator.

For example, the ground control system 120 can present a graphical depiction of the flight plan, including map or satellite information, locations of waypoints and information identifying actions at each waypoint, the flight pattern, the geofence envelope, and so on. The operator can utilize the ground control system 120 to modify one or more aspects of the flight plan, for instance the operator can relocate, remove, or newly include, one or more waypoints (e.g., obstructions may exist at the originally indicated waypoints). Optionally the operator may be constrained to modifying only particular aspects of the flight plan (e.g., the operator can modify waypoints, but be constrained by the geofence envelope, such that the UAV will be unable to navigate outside of the geofence envelope).

Optionally, upon a modification to the flight plan 102, the ground control system 120 can determine whether the authorization information 106 is affected. For example, an addition of one or more waypoints may increase an estimated flight time, and the ground control system can determine whether the UAV 150 will exceed the maximum flight time or whether any non-flight critical components that will be utilized in a manner that negatively affects a safe or successful implementation of the flight plan 102. Optionally, the ground control system 120 can provide the modified flight plan back to the cloud system 100 for approval and authorization, or the ground control system 120 can authorize the modified flight plan according to the description above (e.g., with respect to the cloud system 100).

The ground control system 120 can analyze the flight plan 104 (e.g., as received from the cloud system 100 or as modified by the operator), and can verify that the flight plan 104 is still authorized. For instance, the ground control system 120 can access information identifying present environmental conditions, such as weather information, visibility information, a current time and estimated time at completion of the flight plan 104, and so on. The ground control system 120 can utilize the environmental information to ensure that regulatory rules (e.g., the FAA may require particular operating conditions, such as only flying UAVs during times not within 30 minutes of sunset, flying with a particular minimum visibility, and so on), or other rules (e.g., rules associated with a company that operates the UAV 150), are satisfied.

Additionally, the ground control system 120 can request a current number of flight hours from the UAV 150, and ensure that the UAV 150 can implement the flight plan 104 without exceeding a maximum number of flight hours before maintenance is required. As described above, the UAV 150 may have been used for a different flight plan, and the cloud system 100 may not have been updated with the current flight hours. Thus, the ground control system 120 can request the current number of flight hours, and verify that the UAV 150 is authorized to implement the flight plan 104. If the current hours differ from the hours stored by the cloud system 100, the ground control system 120 can provide the current hours to the cloud system 100 (e.g., wirelessly, if the ground control system 120 is located in an area with access to data reception or otherwise with access to the internet).

Upon verifying that the flight plan 104 is still authorized, the ground control system 120 can then provide the flight plan 104 and authorization information 106 to the UAV 150. As described above, the UAV 150 can be constrained to only implement flight plans, or optionally otherwise fly at all, upon receipt of such authorization information 106. The UAV 150 can verify that (1) the authorization information was validly authorized and provided by one or more of the cloud system 100 or ground control system 120 (e.g., the authorization can be digitally signed, such as with a public/private key encryption process). Additionally, the UAV 150 can verify that it is indeed identified in the authorization information 106 (e.g., the UAV 150 can access identifying information, and verify that the identifying information is specified in the authorization information 106).

Optionally, the UAV 150 (e.g., an operating system of the UAV 150) can maintain one or more persistent statuses or flags in memory, such as non-volatile memory, that govern whether the UAV 150 is authorized to implement a flight plan, ascend, navigate, and so on. The UAV 150 can be configured such that the flags all need to be satisfied (e.g., set in an operational position) for the UAV 150 to implement a flight plan, or optionally even receive a flight plan (e.g., the UAV 150 may reject a communications request, and not download a flight plan). These statuses or flags can be modified (e.g., toggled) by the cloud system 100, ground control system 120, or optionally the UAV 150, for instance based on the authorization information 106 provided to the UAV 150. For example, a first flag can indicate whether the UAV has had a maintenance check completed (e.g., a check completed within a particular time period, such as 6 months, 12 months, the cloud system 100, ground control system 120, UAV 150, or other system of a maintenance employee, may toggle this flag to an inoperative setting if no maintenance check has been performed). A second flag can indicate whether a pre-flight checklist has been completed, for instance an operator utilizing the ground control system 120 may perform a particular checklist (e.g., checking for obstacles that may interfere with a safe or successful flight plan, requesting updated information from the cloud system 100, and so on), and upon performance of the particular checklist, the ground control system 120 may include information in the authorization information 106 indicating that the second flag is to be set in an operational position. A third example flag can indicate whether the UAV 150 has exceeded a maximum number of flight hours before requiring maintenance (e.g., the UAV 150 may set this flag in an inoperative or negative setting upon exceeding the maximum number of flight hours without receiving maintenance, that is the UAV 150 may monitor whether this flag is to be modified to an inoperative setting; furthermore, the cloud system 100 or ground control system 120 may optionally override any setting specified by the UAV 150, for instance override an affirmative positive setting that the UAV has not exceeded maximum flight hours to a negative or inoperative setting). A fourth example flag can indicate whether the UAV may be flown or otherwise navigated (e.g., the fourth example flag may be placed in an operational position by the cloud system 100 or ground control system 120 upon satisfaction of the other flags).

In this way, the UAV 150 may maintain particular statues or flags that can optionally only be modified by the ground control system 120 or cloud system 100, and are specific to particular information associated with the UAV 150 being authorized to implement the flight plan 104. The UAV 150, for instance upon receiving the flight plan 104 and authorization information 106, can determine whether these statues or flags are placed in an operational setting (e.g., the authorization information 106 may modify these flags), and if so the UAV 150 can implement the flight plan 104.

Similarly, the authorization information 106 can set or otherwise modify these statuses or flags to inoperative settings. For example, the cloud system 100 or ground control system 120 may determine that the UAV 150 is outside of a maintenance window (e.g., the UAV 150 has not had maintenance performed for greater than a particular time period), the UAV 150 has exceeded or has met a maximum number of flight hours, and so on. Furthermore, the cloud system 100 or ground control system 120 may determine that the UAV 150 includes a component indicated as being faulty or otherwise problematic and not authorized. For instance, as will be described below with respect to FIG. 2, the cloud system 100 can maintain information describing configuration information of each UAV in a fleet of UAVs. The cloud system 100 can determine whether particular components are faulty (e.g., from manufacturer information), and optionally based on analyzing error logs, maintenance logs, and so on, resulting from UAV being flown, started, booted up, having maintenance performed on them, and so on. The cloud system 100 can utilize the logs to identify components, such as equipment, airframes, types of UAVs, and so on, that are associated with problems. The cloud system 100 can then modify a particular flag (e.g., the fourth example flag described above) of the UAV 150, such that the UAV 150 is placed into an inoperative state. Similarly, these statuses or flags may be modified based on the existence of temporary flight restrictions being active (e.g., as described below, for instance with respect to FIGS. 6-7), and so on.

Optionally, when the ground control system 120 communicates with the UAV 150 (e.g., to provide the flight plan 104 and authorization information 106), the ground control system 120 can obtain values of the statues or flags indicating whether the UAV 150 can be utilized. For instance the UAV 150 may indicate that a maintenance check is required, or that it has met or exceeded a number of flight hours. As an example, the cloud system 100 may not have fully up to date information regarding the UAV 150, and therefore since the flags described above can be maintained in memory (e.g., non-volatile memory) of the UAV 150, the ground control system 120 can quickly determine whether the UAV 150 is able to implement the flight plan 120. If the UAV 150 is inoperative, the ground control system 120 can present information to the operator indicating that the UAV 150 is inoperative.

The UAV 150 can then navigate according to the flight plan 104, with the flight plan (e.g., as described above) including information sufficient to enable the UAV to navigate (e.g., utilizing, for instance, an autopilot). Subsequent to implementation of the flight plan 104, the UAV can provide information to the ground control system 120 and/or cloud system 100 indicating an updated number of flight hours. The cloud system 100 can update the one or more databases with the updated flight hours, and can optionally utilize the empirically determined number of flight hours to more accurately determine time estimates of flight hours for flight plans (e.g., the cloud system 100 can update one or more models).

While navigating, the UAV 150 may receive information from the ground control system 120 removing authorization for the UAV 150 to implement the flight plan. For instance, the ground control system 120 may receive updated information specifying that a particular component has suddenly not been authorized (e.g., a fault has been made public, an exploit has been made public such that the UAV 150 may be at a risk of being improperly accessed during flight, and so on). Furthermore, the ground control system 120 may detect the existence of a temporary flight restriction (TFR), which will be described in more detail below. The UAV 150 can then automatically navigate to a landing location, and the UAV 150 can be placed in a non-operational state. Similarly, while navigating the UAV 150 may exceed, or be within at threshold of, a maximum number of flight hours. The UAV 150 may then automatically navigate to a landing location, or optionally provide information to the ground control system 100 indicating the current flight hours, and the ground control system 120 (e.g., the operator utilizing the system 120) can indicate whether the UAV 150 is to proceed or land. For instance, the operator can monitor progress of the UAV 150, and upon determining that the UAV 150 is almost completed with the flight plan 102, or that the UAV 150 will have to navigate beyond a final waypoint to reach a landing location, the UAV 150 can be instructed to finish implementing the flight plan 102.

Figure 2:
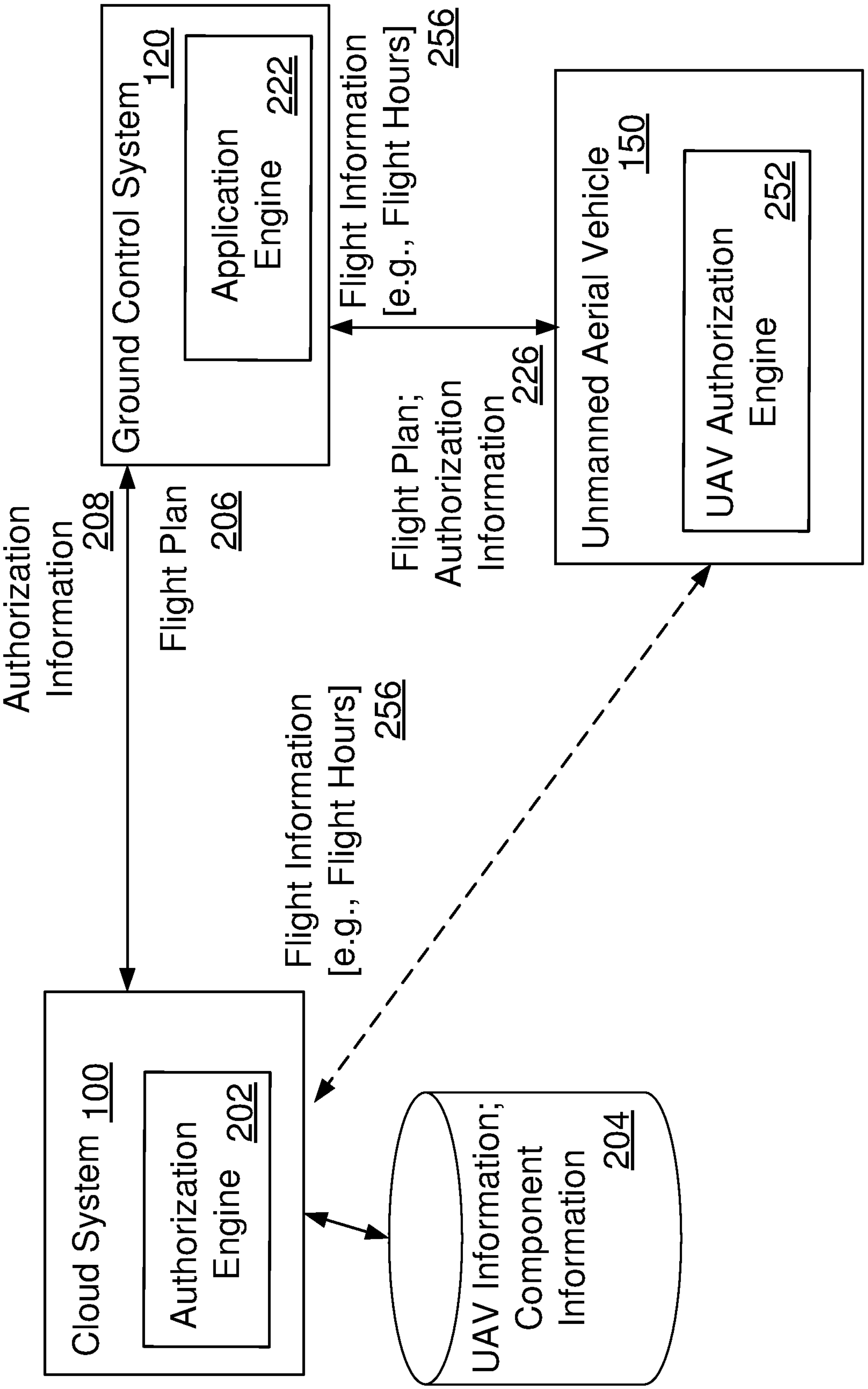
FIG. 2 illustrates a block diagram of a cloud system n communication with a ground control system and an unmanned aerial vehicle (UAV).

FIG. 2 illustrates a block diagram of a cloud system 100 in communication with a ground control system 120 and an unmanned aerial vehicle (UAV) 150. The cloud system 100 can be a system of one or more computers, or one or more virtual machines executing on a system of one or more computers, and can maintain, or be in communication with, one or more databases or storage subsystems (e.g., the UAV information/component information database 204). As described above, the ground control system 120 can be a user device associated with an operator implementing a flight plan 206 generated by the cloud system 100, and can include a laptop, tablet, wearable device, computer, and so on. The ground control system 120 can be in communication (e.g., wired or wireless communication) with the cloud system 100, for instance over a cellular connection (e.g., 3G, 4G, LTE, 5G), or via a mobile device of an operator (e.g., the mobile device can be in communication with the cloud system 100 over a cellular connection, and the mobile device can relay information over a Bluetooth or Wi-Fi connection between the ground control system 120 and cloud system 100). Similarly, the UAV 150 can receive information from, and provide information to, the ground control system 120, for instance over a wired or wireless communication.

As described above with respect to FIG. 1, the cloud system 100 can receive information describing a flight plan, and generate the flight plan 206 such that a UAV can implement the flight plan to perform one or more jobs (e.g., damage inspections, package delivery, and so on). To ensure that the flight plan 206 is implemented timely (e.g., within a particular time period, such as a 7 days, 30 days) and safely (e.g., implemented by a UAV free of faulty or otherwise unauthorized components, implemented according to regulatory, company, rules), the cloud system 100 includes an authorization engine 202 that generates authorization information 208 usable to enable a UAV (e.g., a UAV indicated as being authorized in the information 208) to implement the flight plan 206.

The authorization engine 202 can access a UAV information/component information database 204, and determine UAVs within a fleet of UAVs that are authorized to implement the flight plan 206. For instance, as described above the authorization engine 202 can analyze the flight plan 206, including determining a time estimate associated with the flight plan 206 or receiving an indication of the time estimate from a user of the cloud system 100, and can identify UAVs that can increase their flight hours without exceeding a maximum number of flight hours before maintenance is required. That is, the database 204 can store information associated with the fleet of UAVs, including maintenance information (e.g., times at which the UAVs received maintenance, a number of flight hours the UAVs have flown since a most recent maintenance, and so on) and UAV information (e.g., total flight hours of UAVs, such as from an electronic Hobbs meter that counts or keeps track of the number of hours flown by the UAV, configuration information, and so on), and the authorization engine 202 can access the database 206 to identify UAVs authorized to implement the flight plan 206.

The authorization engine 202 can generate authorization information 208 indicating one or more of, identifiers associated with authorized UAVs (e.g., tail numbers, UIDs, names, locations, of checked in UAVs, and so on), a time associated with the flight plan 206 being active (e.g., the flight plan 206 can become not authorized after the active time), and optionally information identifying a remaining number of flight hours each authorized UAV has until requiring maintenance and an identification of a total number of flight hours of each UAV. Optionally, the authorization engine 202 can include one or more authorization certificates, which can be specific to a particular authorization rule or test performed by the cloud system 100. For example, a first authorization certificate can indicate one or more UAVs authorized to implement the flight plan 206. A second authorization certificate can indicate the active time window associated with the flight plan 206, and so on. As will be described, these authorization certificates may be signed, such that when a UAV 150 associated with implementing the flight plan 206 receives the authorization information 208, the UAV 150 can utilize the authorization certificates to place itself into an active (e.g., able to implement flight plans) mode or status. Optionally, the authorization certificates may be signed, and the flight plan 206 encrypted, such that only particular authorized UAVs may decrypt the flight plan 206 for implementation (e.g., the flight plan 206 may be encrypted using public keys associated with the authorized UAVs, and the UAVs may decrypt the flight plan 206 based on private keys). Optionally, these authorization certificates may modify one or more flags or statues maintained in memory of the UAV 150 (e.g., as described above, with respect to FIG. 1).

As described above, the ground control system 120 can receive the flight plan 206 along with the authorization information 208, and an operator associated with the ground control system 120 can travel to a location at which a particular UAV 150 is to implement the flight plan 206. The ground control system 120 can execute an application engine 222, which optionally can be an application (e.g., an 'app') downloaded from an electronic application store or can be software executing on the ground control system 120. The application engine 222 can analyze the flight plan 206, and present information describing the flight plan 206, for instance as described above with respect to FIG. 1. As an example, the application engine 222 can present a graphical depiction of the flight plan 206 for review and modification by an operator. For any modification of the flight plan 206, the ground control system can verify that the modified flight plan 206 is similarly authorized for implementation.

The ground control system 120, as described above, can verify the authorization information 208 and ensure the flight plan 206, or modified flight plan, are authorized for implementation. For example, the ground control system 120 can determine that the particular UAV 150 is identified in the information 208, that flight hours associated with the particular UAV 150 are current (e.g., the ground control system 120 can request a current specifying of flight hours from the UAV 150, and the ground control system 120 can update the authorization information 208 and/or update the cloud system 100). Additionally, the ground control system can determine whether environmental information, such as weather, visibility, time of day, and so on, are in conformance with particular rules (e.g., regulatory rules, company rules).

The ground control system 120 can provide the flight plan 206 and authorization information 208 (e.g., as a package of information 226) to the UAV 150. As described above, the UAV 150 can optionally be placed in a 'do-not-fly' mode, wherein the UAV 150 is unable to implement flight plans. Additionally, the UAV 150 can be constrained to particular types of flight plans, for instance flight plans associated with testing the UAV 150 (e.g., allowing the UAV 150 to be tested for safety and compliance reasons), with particular types of jobs (e.g., jobs over particular types of areas, such as non-populated areas, and so on). Thus, when the UAV 150 receives the flight plan 206 and authorization information 208, an included UAV authorization engine 252 can review the information 208 and verify one or more of (1) the information being validly from the cloud system 100 and/or ground control system 120 (e.g., signed or otherwise identified), (2) the UAV 150 is identified in the authorization information 208, (3) the UAV 150 has not exceeded a number of flight hours before requiring maintenance or that the UAV 150 will not exceed the number of flight hours after implementation of the flight plan 206 (e.g., the UAV 150 can identify or request the estimated flight time).

Based on the authorization information 208, the UAV authorization engine 252 can modify a current non-operational state or mode, and cause the UAV 150 to be able to implement the flight plan 206. Optionally, the UAV 150's modification of its mode or state can be specific to the flight plan 206, such that authorization information 208 is specific (e.g., associated with) the flight plan 206. In this way, an arbitrary flight plan cannot be provided with the authorization information 208 and be made implementable. The UAV 150 can then implement the flight plan 206, and upon completion, can provide flight information 256, such as present flight hours (e.g., as modified by the actual flight time of the flight plan 208), images or sensor information obtained by the UAV, and so on. Similarly, the UAV 150 can optionally provide flight information 256 for storage by the cloud system 100, or optionally the ground control system 120 can update the cloud system 100 (e.g., over a wired or wireless connection).

Optionally, the UAV authorization engine 252 can limit the UAV 150 to implementing a single flight plan 208, such that after the flight plan 208, the UAV 150 is placed back into a 'do-not-fly' (e.g., non-operational) mode or state. That is, an operator can 'check-out' the UAV 150 from the fleet, and upon implementation of the flight plan 208, the operator can be required to 'check-in' the UAV 150 (e.g., to the cloud system 100). In this way, use of UAVs can be tightly controlled, and UAVs that haven't been checked in (e.g., to upload their present flight hours, for maintenance checks, and so on), can be made not operational. Additionally, UAVs can be associated with a particular amount of time (e.g., flight hours, actual hours, a number of days) that the UAV will be operational before needing to be checked in, or optionally a number of flight plans (e.g., 2, 3, 4). In this way, an operator can implement multiple flight plans in a day, or utilize (e.g., rent) use of the UAV for a specified period of time, and the UAV will be authorized for use during that time. Similarly, the UAV can be constrained to implement only validly generated and authorized flight plans (e.g., as described above).

Figure 3:
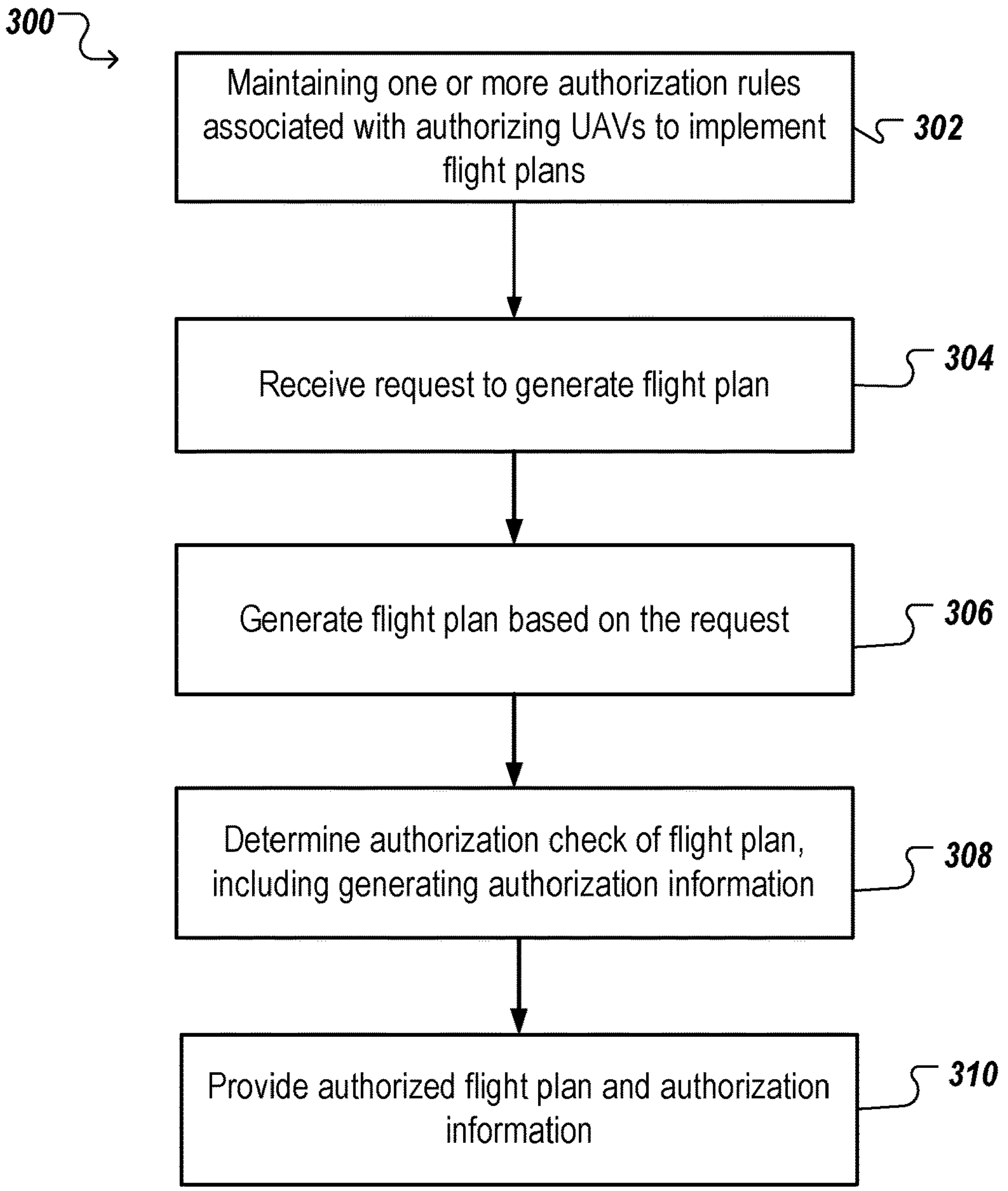
FIG. 3 illustrates an example process for authorizing an unmanned aerial vehicle (UAV) to implement a flight plan.

FIG. 3 illustrates an example process 300 for authorizing an unmanned aerial vehicle (UAV) to implement a flight plan. For convenience, the process 300 will be described as being performed by a system of one or more computers (e.g., the cloud system 100).

The system maintains authorization rules associated with authorizing UAVs to implement flight plans (block 302). As described above, the system can authorize flight plans, including verifying that one or more UAVs can implement a flight plan, that the UAVs does not include or make use of a component (e.g., hardware, software) that is known to be faulty, and so on. Additionally, an authorization rule can be associated with ensuring that no temporary flight restrictions are active for locations at which a UAV will be flying while implementing a flight plan. For instance, the system can determine that while a generated flight plan is active, whether a temporary flight restriction will be active. Additionally, and as will be described with respect to FIGS. 6-7, a user device of an operator (e.g., the ground control system 120) can detect whether any temporary flight restrictions are active prior to implementation of a flight plan, and can further detect whether any become active during implementation of the flight plan—and can instruct a UAV to be grounded.

The authorization steps associated with authorizing a UAV to implement a flight plan can be maintained as particular rules specifiable by users of the system. In this way, the system can receive updates to rules and the rules can be easily provided for presentation to users (e.g., textual descriptions of the rules can be generated, logic to implement the rules can be presented, and so on), enabling quick updating and review of authorization steps.

The system receives a request to generate a flight plan (block 304). As described above, a user of the system can describe a flight plan associated with a job, and the system can generate the flight plan based on the user's request. As an example, the system can generate one or more user interfaces for presentation to the user, and the user can indicate information associated with the flight plan (e.g., locations of waypoints, particular actions, geofence envelopes, take-off and landing locations, and so on as described above).

The system generates the flight plan based on the request (block 306). As described above, the system can generate the flight plan, with the flight plan including information sufficient to enable a UAV to navigate according to the flight plan (e.g., navigate according to a particular flight pattern, handle contingency conditions, and so on).

The system determines an authorization check of the flight plan (block 308). As described above, the system can determine satisfaction of the authorization rules, and identify one or more UAVs within a fleet of UAVs that are authorized to implement the flight plan. For instance as described above with respect to FIG. 1, the system can identify one or more UAVs that can implement the flight plan without exceeding a number of flight hours before a maintenance check is required.

As described above, the system can determine a flight time estimate associated with the flight plan, for instance a number of flight hours that estimated to be required for the flight plan to be completed. Using the flight time estimate, the system can determine whether one or more UAVs will be able to complete the flight plan without exceeding a maximum number of flight hours. To determine the flight estimate, the system can analyze the flight plan, such as a total distance to be traveled by the UAV, a number of waypoints, specific actions to take at the waypoints, and so on, to determine the estimate. The system can utilize historical information associated with flight plans to inform the estimation. For instance, the system can determine an average transition speed between waypoints based on prior implemented flight plans (e.g., UAVs can monitor average speeds during flight, or subsequent to implementation of a flight plan, the system can determine an average speed obtained during the flight plan based on a total flight time and distance traveled), and determine an estimated flight time for each transition between a waypoint. However, since the flight plan may indicate that a UAV is to perform actions while transitioning, such as periodically obtaining sensor measurements or images, the system can analyze the specific actions to be implemented during the flight plan.

For example, the flight plan may indicate that the UAV is to obtain images while transitioning from a first waypoint to a second waypoint at a particular rate periodic in distance (e.g., every 3 meters the UAV is to obtain images). The system can determine that, for instance, based on the configuration information of UAVs (e.g., capabilities of included cameras, such as shutter speeds, optical stabilization, capability of a UAV to maintain a stable course at one or more speeds), and optionally environmental information for a time associated with the flight plan (if a time was so specified), such as expected wind, and determine an estimate of a speed at which the UAV can travel while adhering to the periodic obtaining of images.

In this way, the system can analyze the flight plan, and based on distance to be traveled, specific actions, can determine a time estimate associated with the flight plan. Optionally, the system can include a buffer to the time estimate (e.g., increase the time estimate by a threshold percentage or by a constant, which can depend on the time estimate or the particular job being performed). Optionally, the system can receive an indication of a time estimate from the user, and the system utilize the time estimate, or optionally compare its own time estimate to the user's time estimate. The system can then select the higher of the time estimates, or if the time estimates are different at greater than a threshold percentage, the system can present information to the user indicating the difference (e.g., 'Your time estimate of 4 hours is below an estimated time estimate of 5 hours based on analyzing the flight plan'). Optionally, the user can override the system's time estimate.

Furthermore, as described above the user can select a particular UAV to implement the flight plan, and the system can authorize the particular UAV. For example, while specifying information associated with the flight plan (e.g., as described above, with respect to block 304), the system can access information associated with the particular UAV, and present information to the user indicating a maximum flight time the particular UAV can perform. For instance, the system can present information to the user such as, 'The selected UAV has 995 hours of flight time and will need to be maintenance in 5 hours of flight time'. The system can monitor the description of the flight plan, and can actively determine a time estimate for the flight plan. In this way, the system can specify when the user has exceeded the maximum flight time of the particular UAV. The system can further identify other UAVs that can implement the flight plan, and that optionally include same or similar configuration information. Optionally, the system can access information associated with schedules of use of UAVs, and can utilize the schedule information to indicate UAVs available, with same or similar configuration information, for use in a subsequent period of time (e.g., 7 days, 30 days).

The system generates authorization information, which as described above can include generating one or more authorization certificates indicating satisfaction of the rules. The system provides the flight plan and authorization information to a ground control system (e.g., the ground control system 120) of an operator associated with implementing the flight plan (block 310).

As described above, the ground control system can determine an additional authorization check, for instance while the operator is located at a location associated with the flight plan (e.g., a starting location) or while the ground control system is traveling to the location (e.g., in a car of the operator, the ground control system can request any updates from the system). That is, the ground control system can obtain a current number of flight hours from an authorized UAV being utilized to implement the flight plan. The ground control system can further request any updates to configuration information (e.g., components) that have been indicated as being faulty or otherwise not authorized for use, and can determine whether the UAV includes such a component. The UAV can then receive the flight plan, along with information authorizing the UAV to implement the flight plan.

Figure 4:
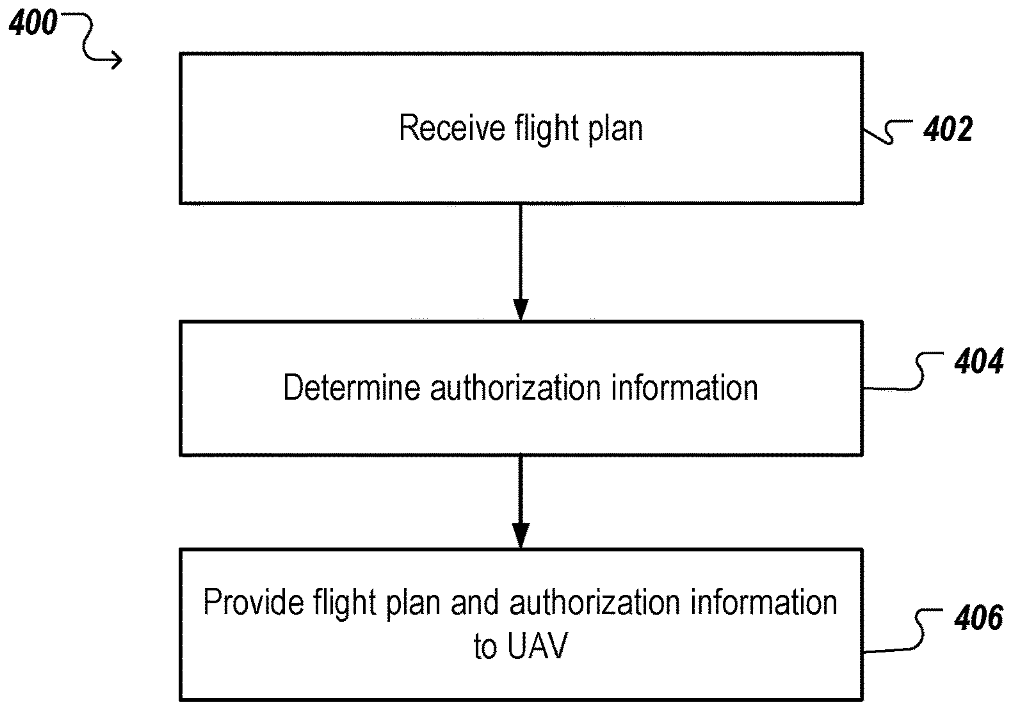
FIG. 4 illustrates another example process of authorizing an unmanned aerial vehicle (UAV) to implement a flight plan.

FIG. 4 illustrates another example process 400 of authorizing an unmanned aerial vehicle (UAV) to implement a flight plan. For convenience, the process will be described as being performed by a user device of one or more processors (e.g., the ground control system 120).

The user device receives a flight plan (block 402). As described above, a system (e.g., the cloud system 100) can generate a flight plan for implementation by a UAV. An operator associated with implementation of the flight plan can utilize the user device to obtain the generated flight plan, and obtain a UAV to be utilized for the flight plan.

As described in FIG. 3, the system can identify one or more UAVs that are authorized to implement the flight plan. Alternatively, the user device can determine one or more UAVs that are authorized (block 404). For instance, the user device can request flight hours of UAVs included in a fleet of UAVs, or a particular UAV selected by the operator, and the user device can determine the authorization check (e.g., based on the rules described above). For example, the user device can request information from the cloud system or from the UAVs or particular UAV.

The user device provides the flight plan and authorization information to a UAV (block 406). As described above, or instance with respect to block 310 of FIG. 3, the UAV provides the flight plan and authorization information such that the UAV can implement the flight plan.

Figure 5:
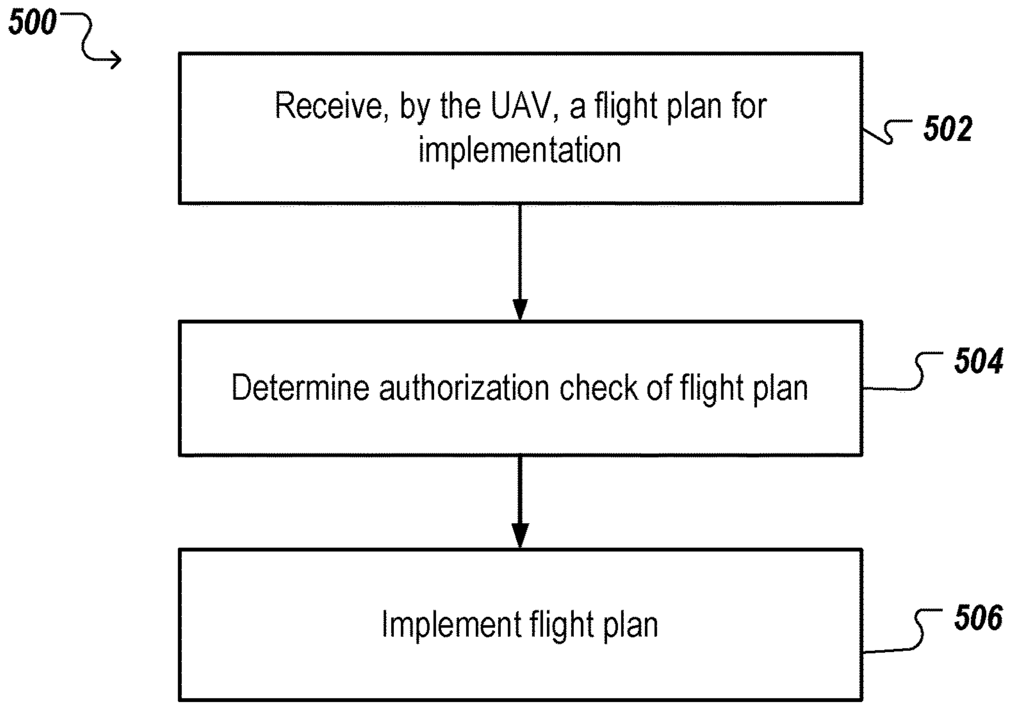
FIG. 5 illustrates another example process of authorizing an unmanned aerial vehicle (UAV) to implement a flight plan.

FIG. 5 illustrates another example process of authorizing an unmanned aerial vehicle (UAV) to implement a flight plan. For convenience, the process 500 will be described as being performed by a device of one or more processors (e.g., the UAV 150).

The UAV receives a flight plan (block 502). As described above, with respect to FIGS. 3-4, a cloud system (e.g., the cloud system 100) in combination with a user device (e.g., the ground control system 120), can generate and authenticate a flight plan for implementation by the UAV. Alternatively, the UAV can receive a flight plan, and authenticate the flight plan itself. For instance, optionally the UAV can execute software associated with different priority levels and levels of access, with a first level being associated with verifying flight plans, and upon verification, a second level can be associated with implementing the flight plan. That is, the UAV can be initially in a state or mode that limits actions the UAV can perform, such as implementing flight plans, ascending, and so on. The UAV can receive the flight plan, and utilizing maintained information and optionally information requested from the cloud system or user device, can authenticate the flight plan for implementation.

The UAV determines an authorization check of the flight plan (block 504). The UAV can determine or receive an estimated flight time of the flight plan (e.g., as described above), and can access a number of flight hours of the UAV (e.g., a number since a maintenance check) to determine whether the UAV can complete the flight plan without exceeding a maximum number of flight hours. Additionally, the UAV can maintain or optionally request components that are not authorized for use, and can by accessing configuration information, can determine the UAV includes any unauthorized components. Furthermore, the UAV can determine that the flight plan is still active (e.g., as described above, a flight plan can be active and available for implementation for a period of time from generation, such as 7 days, 30 days, and so on).

Upon successful authorization check, the UAV implements the flight plan (block 506). As described above, the UAV can be initially in a 'do-not-fly' mode or state, and can modify the state based on the UAV being authorized to implement the flight plan.

Figure 6:
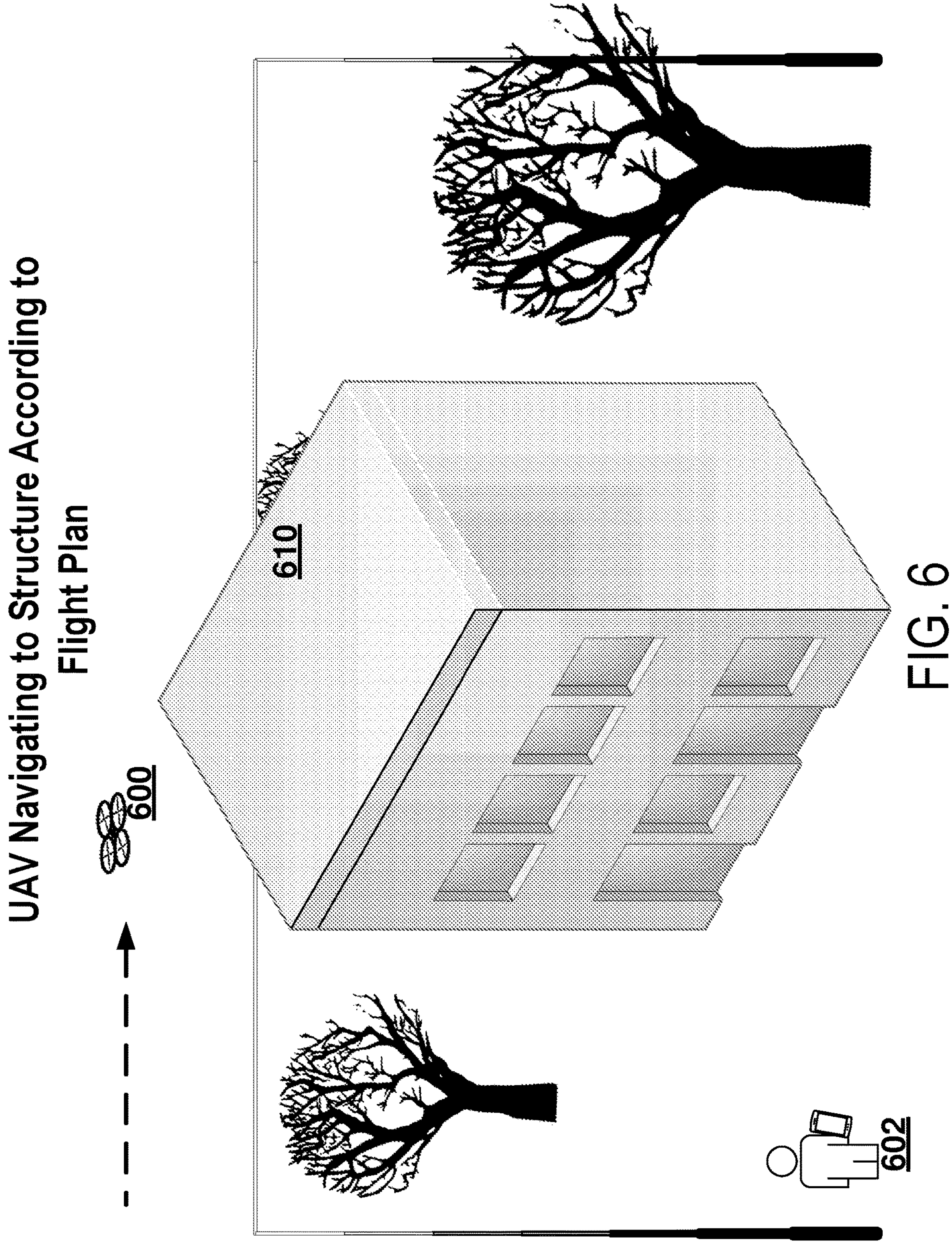
FIG. 6 illustrates an example block diagram of an unmanned aerial vehicle (UAV) implementing a flight plan.

FIG. 6 illustrates an example block diagram of an unmanned aerial vehicle (UAV) implementing a flight plan. FIG. 6 illustrates an example UAV 600 that has received a flight plan associated with inspecting a structure 610 (e.g., a house, building, and so on) and has been authorized to implement the flight plan (e.g., in combination with an operator 602 utilizing a ground control system, such as ground control system 120). As described above, the UAV 600 can navigate according to the flight plan (e.g., utilizing an autopilot, and so on).

As described above, a temporary flight restriction (TFR) may not be existent prior to the UAV 600 initiating the flight plan, but may at some point be created (e.g., by a regulatory agency, such as the Federal Aviation Authority), sometimes referred to as a pop-up TFR. For instance, prior to the UAV 600 ascending and initiating implementation of the flight plan, the ground control system of the operator can request whether any TFRs are active within a geofence envelope associated with the flight plan, or within the geofence envelope and a buffer (e.g., 50, 100, 250, meters further than the geofence envelope). As an example, the ground control system can request information from a regulatory agency (e.g., over the Internet, using a radio, such as a software defined radio, that can access Automatic dependent surveillance-broadcast information, and so on), from the cloud system, or the operator 602 can manually check (e.g., call a regulatory agency, and so on).

Figure 7:
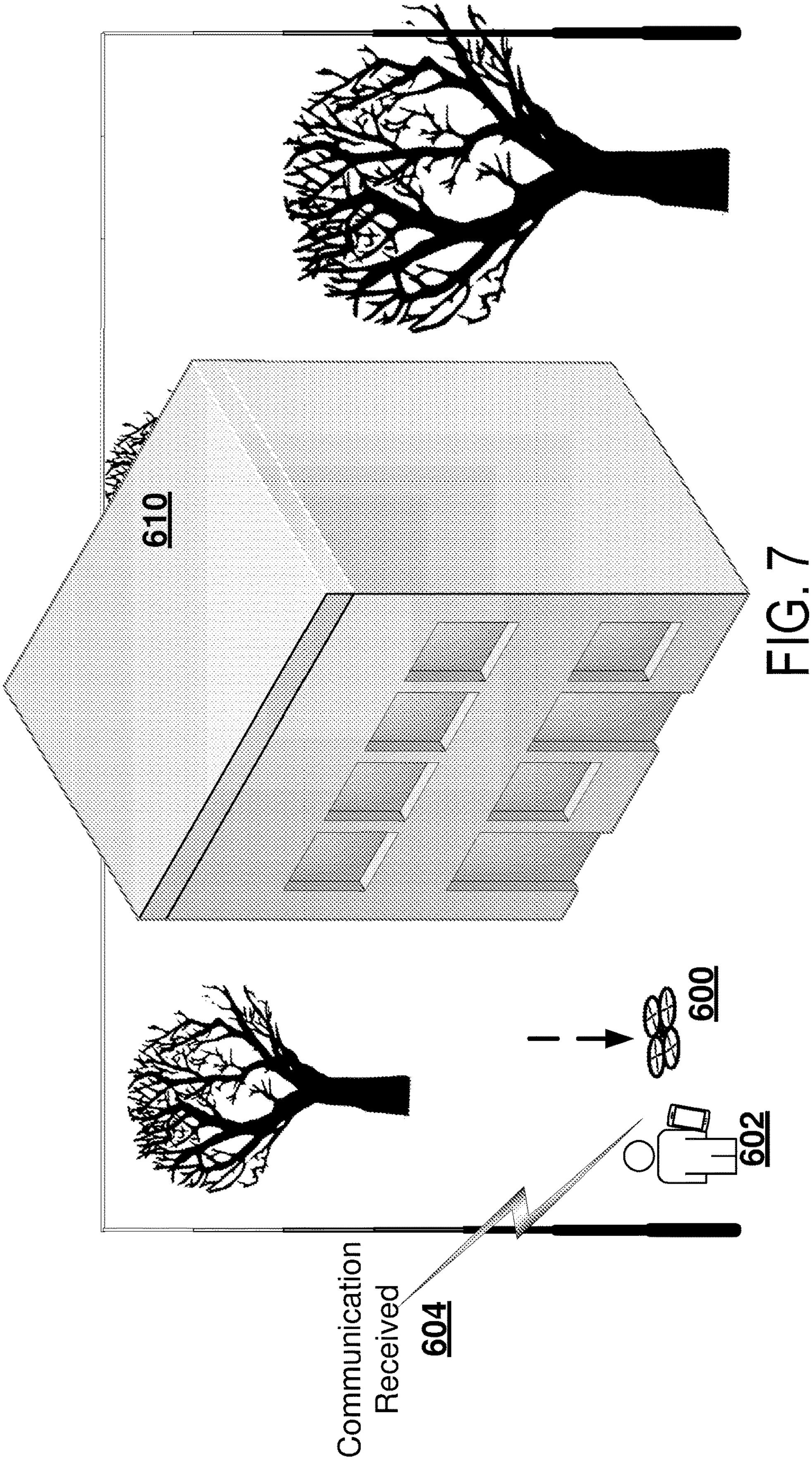
FIG. 7 illustrates detection of a temporary flight restriction (TFR).

FIG. 7 illustrates detection of a temporary flight restriction (TFR). As described above, with respect to FIG. 1, the cloud system (e.g., cloud system 100) may monitor the creation or sudden activation of TFRs. Upon detecting of a TFR, the cloud system can determine whether any generated flight plans (e.g., active flight plans, flight plans scheduled to occur that day or at that time) are located, at least in part, within an active TFR. The cloud system can then provide information identifying the updated TFR to all ground control systems being utilized, and the ground control system can determine whether its flight plan is within the TFR. Alternatively, the cloud system can provide information identifying the updated TFR to all ground control systems that are being utilized, or optionally solely to ground control systems that are within a threshold distance of the TFR or that are being used for flight plans within the TFR. That is, the cloud system can maintain, or request, location information of all ground control systems that are being utilized, and provide information to affected ground control systems (e.g., ground control systems associated with UAVs within the TFR). Similarly, the cloud system can access information indicating a ground control system that received a flight plan which will be affected by the TFR (e.g., as described above, the cloud system can provide flight plans and authorization information to particular ground control systems, the cloud system can then access flight plan information, and determine which ground control system(s) received an affected flight plan).

As described above, the ground control system of the operator 602 may receive information 604 indicating the TFR (e.g., from the cloud system, from a regulatory agency, and so on). Additionally, the ground control system may not have data cellular reception, or not include radio capabilities to monitor locations of active TFRs, and the cloud system can push information to a mobile device of the operator 602 (e.g., an SMS or MMS message, a phone call). For instance, the cloud system can push a text message indicating the existence of the TFR, and the operator's 602 mobile device can include an application which can automatically parse the received text message, and provide information to the ground control system (e.g., over Bluetooth or Wi-Fi) indicating the active TFR. In this way, TFRs can be detected in more remote locations than locations where data service is readily available.

Upon detecting of the TFR, the ground control system of the operator 602 can provide information to the UAV 600 to immediately be grounded. That is, the ground control system can indicate that the UAV 600 is no longer authorized to implement the flight plan, and the UAV 600 will thereby be grounded. The UAV 600 may identify a nearest landing location, and immediately land, or determine whether it can descend at its present location, and immediately descend.

While the above describes determining the existence or occurrence of a TFR by the cloud system. Alternatively, the ground station may similarly determine the TFR from various online sources. In other embodiments, the cloud system may provide TFR information directly to a UAV, or the UAV directly may access Internet-based services indicating the existing of TFRs. It is possible that during in-flight operation of the UAV that a TFR is activated for an airspace in which the UAV is flying, or near an airspace in which the UAV is flying. The ground control station may receive the position of the UAV, and determine whether the UAV is actively flying in the airspace of the pop-up TFR. In such cases, the UAV may receive flight commands to terminate the existing flight path, and return to a home landing location, or land immediately. Also, the ground control station may determine that the UAV is not actively flying within a pop-up TFR, but identify that a current flight plan or flight path of the UAV will cause the UAV to fly into the airspace of the TFR. The ground control station may provide the UAV operator a warning about the TFR and optionally provide a user interface affordance for one or more of a flight path correction to avoid the TFR, or an option to terminate the current flight plan. Upon receipt of the selection to correct the flight path to avoid the TFR, the ground control station will determine the overall flight time of the UAV, and determine whether a flight path correction to avoid the TFR is possible. If so, the ground control station will provide an updated flight path to the UAV. If the UAV cannot navigate to avoid the TFR, then the ground control station provides information that the flight path correction is not achievable, and may provide options to terminate the existing flight path, and have the UAV return to a home landing location.

Figure 8:
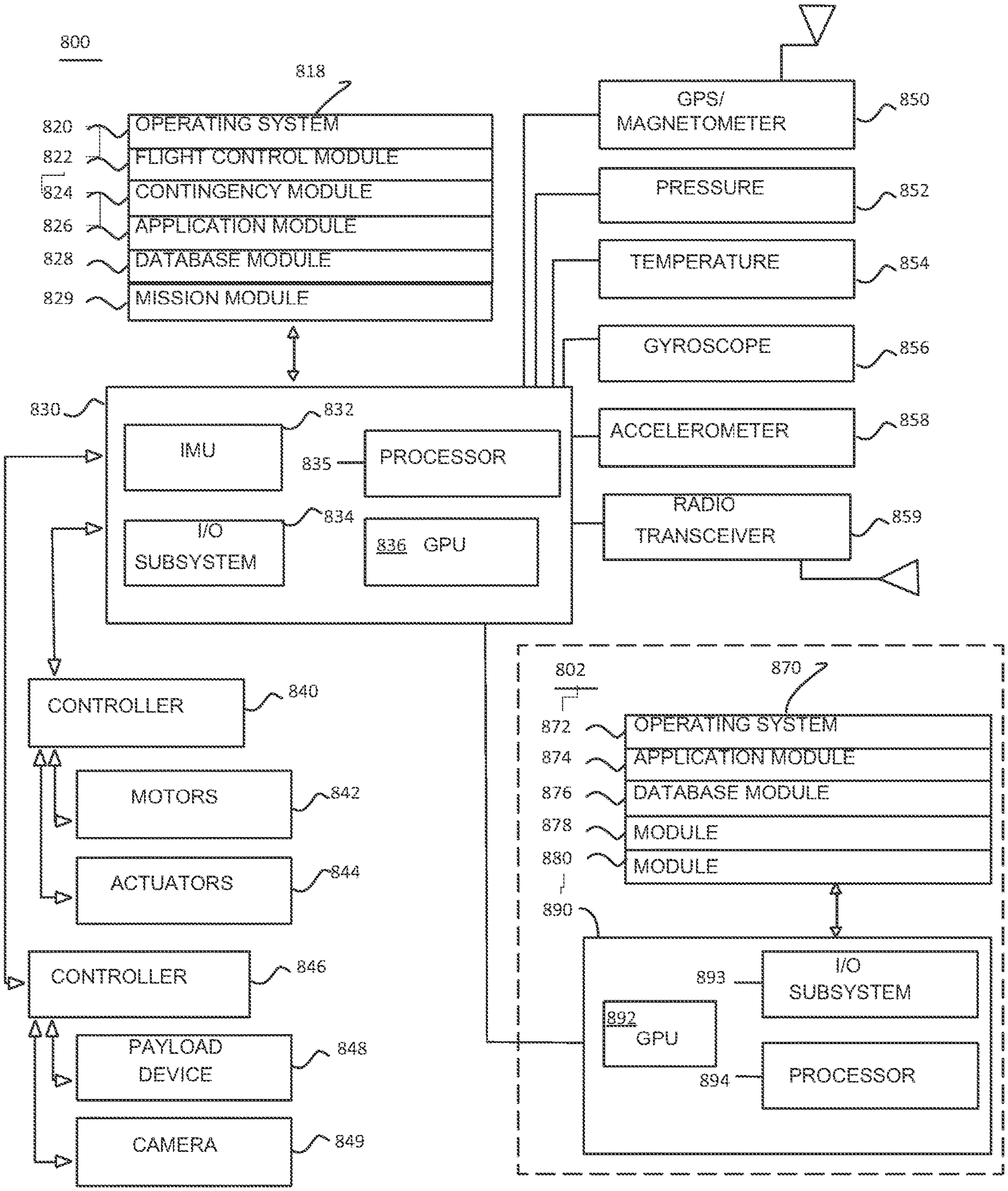
FIG. 8 illustrates a block diagram of an example Unmanned Aerial Vehicle (UAV) architecture for implementing the features and processes described herein.

FIG. 8 illustrates a block diagram of an example Unmanned Aerial Vehicle (UAV) architecture for implementing the features and processes described herein. A UAV primary processing system 800 can be a system of one or more computers, or software executing on a system of one or more computers, which is in communication with, or maintains, one or more databases. The UAV primary processing system 800 can be a system of one or more processors 835, graphics processors 836, I/O subsystem 834, logic circuits, analog circuits, associated volatile and/or non-volatile memory, associated input/output data ports, power ports, etc., and/or one or more software processing executing one or more processors or computers. Memory 818 may include non-volatile memory, such as one or more magnetic disk storage devices, solid state hard drives, or flash memory. Other volatile memory such a RAM, DRAM, SRAM may be used for temporary storage of data while the UAV is operational. Databases may store information describing UAV flight operations, flight plans, contingency events, geofence information, component information, and other information.

The UAV processing system may be coupled to one or more sensors, such as GPS receivers 850, gyroscopes 856, accelerometers 858, pressure sensors (static or differential) 852, current sensors, voltage sensors, magnetometer, hydrometer, and motor sensors. The UAV may use an inertial measurement unit (IMU) 832 for use in navigation of the UAV. Sensors can be coupled to the processing system, or to controller boards coupled to the UAV processing system. One or more communication buses, such as a CAN bus, or signal lines, may couple the various sensor and components.

Various sensors, devices, firmware and other systems may be interconnected to support multiple functions and operations of the UAV. For example, the UAV primary processing system 800 may use various sensors to determine the vehicle's current geo-spatial location, attitude, altitude, velocity, direction, pitch, roll, yaw and/or airspeed and to pilot the vehicle along a specified route and/or to a specified location and/or to control the vehicle's attitude, velocity, altitude, and/or airspeed (optionally even when not navigating the vehicle along a specific path or to a specific location).

The flight control module 822 handles flight control operations of the UAV. The module interacts with one or more controllers 840 that control operation of motors 842 and/or actuators 844. For example, the motors may be used for rotation of propellers, and the actuators may be used for flight surface control such as ailerons, rudders, flaps, landing gear, and parachute deployment.

The contingency module 824 monitors and handles contingency events. For example, the contingency module may detect that the UAV has crossed a border of a geofence, and then instruct the flight control module to return to a predetermined landing location. Other contingency criteria may be the detection of a low battery or fuel state, or malfunctioning of an onboard sensor, motor, or a deviation from the flight plan. The foregoing is not meant to be limiting, as other contingency events may be detected. In some instances, if equipped on the UAV, a parachute may be deployed if the motors or actuators fail.

The mission module 829 processes the flight plan, waypoints, and other associated information with the flight plan as provided to the UAV in the flight package. The mission module 829 works in conjunction with the flight control module. For example, the mission module may send information concerning the flight plan to the flight control module, for example lat/long waypoints, altitude, flight velocity, so that the flight control module can autopilot the UAV.

The UAV may have various devices connected to it for data collection. For example, photographic camera 849, video cameras, infra-red camera, multispectral camera, and Lidar, radio transceiver, sonar, TCAS (traffic collision avoidance system). Data collected by the devices may be stored on the device collecting the data, or the data may be stored on non-volatile memory 818 of the UAV processing system 800.

The UAV processing system 800 may be coupled to various radios, and transmitters 859 for manual control of the UAV, and for wireless or wired data transmission to and from the UAV primary processing system 800, and optionally the UAV secondary processing system 802. The UAV may use one or more communications subsystems, such as a wireless communication or wired subsystem, to facilitate communication to and from the UAV. Wireless communication subsystems may include radio transceivers, and infrared, optical ultrasonic, electromagnetic devices. Wired communication systems may include ports such as Ethernet, USB ports, serial ports, or other types of port to establish a wired connection to the UAV with other devices, such as a ground control system, flight planning system, or other devices, for example a mobile phone, tablet, personal computer, display monitor, other network-enabled devices. The UAV may use a light-weight tethered wire to a ground control station for communication with the UAV. The tethered wire may be removably affixed to the UAV, for example via a magnetic coupler.

Flight data logs may be generated by reading various information from the UAV sensors and operating system and storing the information in non-volatile memory. The data logs may include a combination of various data, such as time, altitude, heading, ambient temperature, processor temperatures, pressure, battery level, fuel level, absolute or relative position, GPS coordinates, pitch, roll, yaw, ground speed, humidity level, velocity, acceleration, contingency information. This foregoing is not meant to be limiting, and other data may be captured and stored in the flight data logs. The flight data logs may be stored on a removable media and the media installed onto the ground control system. Alternatively, the data logs may be wirelessly transmitted to the ground control system or to the flight planning system.

Modules, programs or instructions for performing flight operations, contingency maneuvers, and other functions may be performed with the operating system. In some implementations, the operating system 120 can be a real time operating system (RTOS), UNIX, LINUX, OS X, WINDOWS, ANDROID or other operating system. Additionally, other software modules and applications may run on the operating system, such as a flight control module 822, contingency module 824, application module 826, and database module 828. Typically flight critical functions will be performed using the UAV processing system 800. Operating system 820 may include instructions for handling basic system services and for performing hardware dependent tasks.

In addition to the UAV primary processing system 800, a secondary processing system 802 may be used to run another operating system to perform other functions. A UAV secondary processing system 802 can be a system of one or more computers, or software executing on a system of one or more computers, which is in communication with, or maintains, one or more databases. The UAV secondary processing system 802 can be a system of one or more processors 894, graphics processors 892, I/O subsystem 894 logic circuits, analog circuits, associated volatile and/or non-volatile memory, associated input/output data ports, power ports, etc., and/or one or more software processing executing one or more processors or computers. Memory 870 may include non-volatile memory, such as one or more magnetic disk storage devices, solid state hard drives, flash memory. Other volatile memory such a RAM, DRAM, SRAM may be used for storage of data while the UAV is operational.

Ideally modules, applications and other functions running on the secondary processing system 802 will be non-critical functions in nature, that is if the function fails, the UAV will still be able to safely operate. In some implementations, the operating system 872 can be based on real time operating system (RTOS), UNIX, LINUX, OS X, WINDOWS, ANDROID or other operating system. Additionally, other software modules and applications may run on the operating system 872, such as an application module 874, database module 876. Operating system 802 may include instructions for handling basic system services and for performing hardware dependent tasks.

Also, controllers 846 may be used to interact and operate a payload device 848, and other devices such as photographic camera 849, video camera, infra-red camera, multispectral camera, stereo camera pair, Lidar, radio transceiver, sonar, laser ranger, altimeter, TCAS (traffic collision avoidance system), ADS-B (Automatic dependent surveillance-broadcast) transponder. Optionally, the secondary processing system 802 may have coupled controllers to control payload devices.

Each of the processes, methods, instructions, applications and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smart phone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop down menu, a tool bar, a pop up menu, interactive voice response system, or otherwise.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage. Electronic data sources can include databases, volatile/non-volatile memory, and any memory system or subsystem that maintains information.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

The term "a" as used herein should be given an inclusive rather than exclusive interpretation. For example, unless specifically noted, the term "a" should not be understood to mean "exactly one" or "one and only one"; instead, the term “a” means “one or more” or “at least one,” whether used in the claims or elsewhere in the specification and regardless of uses of quantifiers such as “at least one,” “one or more,” or “a plurality” elsewhere in the claims or specification.

The term “comprising” as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While certain example embodiments have been described, these embodiments have been presented by way of example only, and are not intended to limit the scope of the disclosure. Nothing in the description is intended to imply that any particular element, feature, characteristic, step, module, or block is necessary or indispensable. The novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the to the above-described embodiments, the elements of which are to be understood as being among other acceptable examples. All such modifications and variations are intended to be included herein within the scope of the disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method implemented by an unmanned aerial vehicle (UAV) for executing a mission, the method comprising:

receiving, at the UAV, a flight plan including navigation information and associated authorization information generated by a computer system;

verifying, by the UAV, that the authorization information is valid and that the UAV is identified in the authorization information;

determining, by the UAV, based on operational status data stored in non-volatile memory, whether a plurality of operational state flags maintained in the non-volatile memory are in operational settings indicating compliance with predefined readiness conditions, the plurality of operational state flags including at least a maintenance status flag, a pre-flight checklist flag, a flight-hour limit flag, and a flight-permission flag indicating whether the UAV may be flown or otherwise navigated, wherein the authorization information sets or modifies one or more of the plurality of operational state flags, wherein the flight-permission flag is placed in the operational setting upon satisfaction of the maintenance-status flag, the pre-flight-checklist flag, and the flight-hour-limit flag, and wherein the determining is performed locally by the UAV prior to enabling propulsion or autonomous flight control;

in response to the verifying and determining being affirmative, transitioning the UAV from a non-operational mode to an operational mode; and autonomously navigating the UAV according to the flight plan within a geofence specified by the navigation information.

2. The method of claim 1, wherein the navigation information includes at least one of a set of waypoints, geofence information, distances between waypoints, actions to be performed at the set of waypoints, and an estimated transit speed between waypoints derived from historical flight plan execution data.

3. The method of claim 2, wherein the estimated transit speed is adjusted based on environmental information including at least one of expected wind speed, visibility, or time of day.

4. The method of claim 1, wherein the flight plan is generated based on an estimated flight time determined from the navigation information.

5. The method of claim 4, wherein the estimated flight time is increased by a predetermined buffer margin before being used to determine whether the UAV satisfies a flight-hour limit condition.

6. The method of claim 1, wherein the flight plan is authorized by a cloud system that generates the flight plan and is subsequently authorized by a ground control system that transmits the flight plan to the UAV.

7. The method of claim 1, wherein the maintenance status flag is indicative of whether a maintenance check has been completed within a required interval, and wherein the flight-hour limit flag is indicative of whether a maximum number of flight hours since maintenance will not be exceeded by execution of the flight plan, and wherein the pre-flight checklist flag is indicative of whether a pre-flight checklist has been completed.

8. The method of claim 1, wherein verifying that the authorization information is valid includes verifying a digital signature generated by the computer system.

9. The method of claim 1, wherein the authorization information is specific to the flight plan and is configured to prevent execution of any flight plan not associated with the authorization information.

10. The method of claim 1, wherein the flight plan is encrypted using a public key associated with the UAV, and wherein the UAV decrypts the flight plan using a corresponding private key stored on the UAV.

11. The method of claim 1, wherein determining compliance with predefined readiness conditions further includes:

verifying that no onboard components are identified in a component blacklist, the component blacklist stored on the UAV or received from the computer system.

12. The method of claim 11, wherein the component blacklist is updated in real time from the computer system based on manufacturer recall information, vulnerability advisories, or operational error logs.

13. The method of claim 1, wherein determining compliance with predefined readiness conditions further includes:

verifying that all required onboard components are identified in a component whitelist.

14. The method of claim 1 further comprising:

during autonomous navigation according to the flight plan, receiving an alert of a temporary flight restriction from the computer system via a low-bandwidth communication channel including at least one of a short message service (SMS) message or a voice call.

15. The method of claim 1 further comprising:

upon detecting that an updated authorization condition is not satisfied during flight, automatically executing a contingency action including at least one of terminating the mission, altering the flight path to avoid a restricted area, or navigating to a designated landing location.

16. An unmanned aerial vehicle (UAV) comprising:

a non-volatile memory storing operational status data and a plurality of operational state flags;

a communication interface configured to receive a flight plan including navigation information and associated authorization information generated by an external computer system; and one or more processors configured to:

verify that the authorization information is valid and that the UAV is identified in the authorization information, determine, based on the operational status data persistently stored in the non-volatile memory of the UAV, whether the operational state flags are in operational settings indicating compliance with predefined readiness conditions, the operational state flags including at least a maintenance-status flag, a pre-flight checklist flag, a flight-hour limit flag, and a flight-permission flag indicating whether the UAV may be flown or otherwise navigated, wherein the authorization information sets or modifies one or more of the operational state flags, and wherein the flight-permission flag is placed in an operational setting upon satisfaction of the maintenance-status flag, the pre-flight-checklist flag, and the flight-hour-limit flag, perform the determination locally on the UAV prior to enabling propulsion or autonomous flight control, in response to the verifying and determining being affirmative, transition the UAV from a non-operational mode to an operational mode, and control autonomous navigation of the UAV according to the flight plan within a geofence specified in the navigation information.

17. The UAV of claim 16, wherein the authorization information is digitally signed by the external computer system and the processors are configured to verify the digital signature.

18. The UAV of claim 16, wherein the flight plan is encrypted using a public key associated with the UAV and the processors are configured to decrypt the flight plan using a corresponding private key stored on the UAV.

19. The UAV of claim 16, wherein at least one of the predefined readiness conditions includes verifying that no onboard component is identified in a component blacklist stored in the non-volatile memory or received from the external computer system, and wherein the component blacklist is updated in real time by the external computer system based on at least one of manufacturer recall information, vulnerability advisories, or operational error logs.

20. The UAV of claim 16, wherein the processors are further configured to receive an alert of a temporary flight restriction via a low-bandwidth communication channel comprising at least one of a short message service (SMS) message or a voice call.

21. The UAV of claim 16, wherein the communication interface is configured to receive the flight plan after the flight plan has been authorized by a cloud system that generates the flight plan and subsequently authorized by a ground control system that transmits the flight plan to the UAV.

22. The UAV of claim 16 further comprising:

the communication interface configured to receive updated authorization information during flight; and the one or more processors further configured to:

determine, during execution of the flight plan, whether an updated authorization condition is not satisfied based on the updated authorization information and the operational state flags; and in response to the updated authorization condition not being satisfied, automatically execute a contingency action comprising at least one of terminating the mission, altering the flight path to avoid a restricted area, or navigating to a designated landing location.

23. A non-transitory computer-readable medium storing instructions that, when executed by one or more processors of an unmanned aerial vehicle (UAV), cause the UAV to:

receive a flight plan including navigation information and associated authorization information generated by an external computer system;

verify that the authorization information is valid and that the UAV is identified in the authorization information;

determine, based on operational status data persistently stored in non-volatile memory of the UAV, whether a plurality of operational state flags maintained in the non-volatile memory of the UAV are in operational settings indicating compliance with predefined readiness conditions, the plurality of operational state flags including at least a maintenance status flag, a pre-flight checklist flag, a flight-hour limit flag, and a flight-permission flag indicating whether the UAV may be flown or otherwise navigated, wherein the authorization information sets or modifies one or more of the plurality of operational state flags, and wherein the flight-permission flag is placed in an operational setting upon satisfaction of the maintenance-status flag, the pre-flight checklist flag, and the flight-hour-limit flag;

perform the determination locally on the UAV prior to enabling propulsion or autonomous flight control;

in response to the verification and determination being affirmative, transition the UAV from a non-operational mode to an operational mode; and autonomously navigate the UAV according to the flight plan within a geofence specified in the navigation information.

24. The non-transitory computer-readable medium of claim 23, wherein the instructions further cause the UAV to:

receive updated authorization information during execution of the flight plan, determine whether an updated authorization condition is not satisfied based on the updated authorization information and the operational state flags, and in response to the updated authorization condition not being satisfied, automatically execute a contingency action including at least one of terminating the mission, altering the flight path to avoid a restricted area, or navigating to a designated landing location.

25. The non-transitory computer-readable medium of claim 23, wherein the instructions further cause the UAV to decrypt the flight plan using a private key stored on the UAV, the flight plan having been encrypted using a public key associated with the UAV.

* * * * *